United States Patent [19]
Cutler

[11] 3,889,179
[45] June 10, 1975

[54] DIRECTIONAL PICKUP COIL AND OSCILLATOR APPARATUS FOR THE LOCATION OF BURIED ELECTRICALLY CONDUCTING ELEMENTS

[75] Inventor: Percy H. Cutler, Menlo Park, Calif.

[73] Assignee: Cranleigh Electro-Thermal, Inc., Menlo Park, Calif.

[22] Filed: Jan. 21, 1974

[21] Appl. No.: 434,919

[52] U.S. Cl. .......................... 324/3; 324/67; 331/65
[51] Int. Cl. ............................ G01v 3/08; H03b 5/00
[58] Field of Search ............... 324/3, 67, 5, 123, 52, 324/133; 331/65, 111, 117, 177; 340/248 D, 253 Q, 258 D

[56] References Cited
UNITED STATES PATENTS

| | | | |
|---|---|---|---|
| 2,651,021 | 9/1953 | Hays | 324/52 |
| 2,909,725 | 10/1959 | Bell | 324/5 X |
| 2,976,419 | 3/1961 | Menke et al. | 331/64 X |
| 3,204,183 | 8/1965 | Hasenzahl | 340/253 Q X |
| 3,418,572 | 12/1968 | Humphreys | 324/3 X |
| 3,453,532 | 7/1969 | Gardiner | 324/3 |
| 3,467,855 | 9/1969 | Rance | 324/3 |
| 3,656,066 | 4/1972 | Reynal | 331/65 |
| 3,662,255 | 5/1972 | Garrett | 324/3 |

Primary Examiner—Gerard R. Strecker
Attorney, Agent, or Firm—Julian Caplan

[57] ABSTRACT

A directional pickup coil is moved over a surface to locate an electrically energized conductor beneath the surface by coil generated signals of increasing frequency as the coil is moved closer to the conductor location and an absence of signals upon coil and conductor alignment. The depth of the conductor below the surface is precisely determined by moving the coil in a predetermined angular relationship to the surface in a direction parallel to the surface to a point of zero signal and triangulating the conductor depth from the conductor location.

2 Claims, 5 Drawing Figures

DIRECTIONAL PICKUP COIL AND OSCILLATOR APPARATUS FOR THE LOCATION OF BURIED ELECTRICALLY CONDUCTING ELEMENTS

BACKGROUND OF INVENTION

There have been developed a variety of different types of devices for the location of hidden pipes, conduits, and the like, that are disposed at undertermined locations beneath the surface of the ground or behind walls, for example. Hand-carried mine detectors are well known as are hand-held stud finders, and equipment of this general type varies from extremely simple to very complex equipment. More sophisticated equipment may provide some type of audible or visual signal which may either increase or decrease in frequency as the locator approaches the object to be located and reverses the procedure as the locator is moved away from the object. This type of device suffers from the substantial inaccuracy of dependence upon an operator's decision as to when the signal is either maximized or minimized. Aside from the location of a buried or hidden object, there exists what may often be a very substantial problem of determining the depth the object is located from the visual surface covering it. Solutions to this problem are only available through highly complex equipment such as, for example, sonar equipment for determining the depth of an object below the surface of water.

In general, hand-held and simply operated locators provide at most very imprecise indications of the location and depth of objects that may be buried in the ground or disposed behind masonry or the like.

SUMMARY OF INVENTION

The present invention provides a simple hand-held locator for precisely determining the location of any electrically conducting element that is buried beneath the ground, located within a wall, or in any other way hidden from view, and this locator is also applicable to the precise determination of the depth of the object beneath an available surface.

The present invention provides both method and apparatus for precisely locating any electrically conducting element such as a pipe or conduit that is disposed beneath or behind a surface. The method of the present invention provides for passing an alternating electrical current through an electrically conducting object to be located and moving a directional pickup coil over a surface behind which the object is disposed. Magnetic lines to force about the object are established by the alternating current passing therethrough and a directional pickup coil is used to generate an electrical signal that, in turn, is employed to produce an audio or visual indication of a frequency that increases as the coil approaches the object. Furthermore, the method of the present invention provides for nulling the audio or visual signal such that no such signal is produced when the coil is aligned with the object behind the surface. This then precisely locates the object behind the surface. The method of the present invention further provides for determining depth of the object behind the surface. This is herein accomplished by setting the coil at a known angle to the surface at the location point of the object and then moving the coil away from the object along the surface and parallel thereto while maintaining the same angular relationship between coil and surface until the audio or visual signal becomes zero. At this latter point the distance the coil has been moved is geometrically related to the coil position at location of the object and the last coil position set forth above and thus, by triangulation, the depth of the coil beneath the obscuring surface is readily determined.

The locator apparatus of the present invention comprises a small hand-held unit incorporating a flat directional pickup coil connected to an operational amplifier having an RC feedback loop initially adjusted to the verge of one-shot oscillation. An indicator such as an audio generator is connected to the foregoing to produce distinct sound signals. The operational amplifier is biased to act as a one-shot oscillator when sufficient induced field in the coil triggers the amplifier through the cycle thereof so that the rate of audio signals increases with increased output from the pickup coil produced by increasing magnetic field strength until the coil is aligned with the magnetic field and thus with the buried conductor. Consequently the rapidity or repetition rate of audio or visual signals of the hand-held unit increases as the locator is moved parallel to the surface until the locator is disposed directly above or in line with the buried conductor whereat the audio or visual signals terminate.

The present invention may also be employed to warn a person carrying the locator of the presence of steady magnetic fields. Movement of the locator into a steady magnetic field will cause the pickup coil to cut lines of force and thus produce a signal for operating the indicator to generate an audio or visual alarm signal.

DESCRIPTION OF FIGURES

The present invention is illustrated as to a particular preferred embodiment thereof in the accompanying drawings wherein.

DESCRIPTION OF PREFERRED EMBODIMENT

The present invention comprises both method and apparatus and the appliance is physically embodied as a small box or the like which may be held in the hand for the precise location of a buried element capable of conducting electricity. In the following description of a preferred embodiment and preferred steps in the method of the present invention, the term "buried element" is taken as defining any electrically conducting element such as an iron pipe, an electrical conduit, electrical wiring or the like, which is disposed behind or beneath an obscuring surface such as ground level or a wall or floor or ceiling of a building, for example. The limitation upon the buried element is that same must be capable of conducting electricity and it is provided as a portion of the present invention that an alternating electrical current shall be passed through the element. It is realized that at least some buried elements may not be capable of electrical connection in order to pass an electrical current therethrough; however, at least a large number of buried elements of interest as to location may be electrically contacted so that an alternating current may be passed therethrough. Thus, for example, a water pipe extending under a street may have indentifiable and readily available ends or portions located at manholes or the like but may have an indeterminate position beneath the street both as to location and depth. It is furthermore noted that in the following description the term "location" is broadly taken to denote the position of the element beneath the obscuring surface and also the depth of such element. In certain portions of the description the term "location" is otherwise employed as defining only the position of the element with respect to the lateral extent of the obscuring surface and the depth of the element is alternatively treated. In the following description these alternative manners of description are clearly defined.

Figure 3:
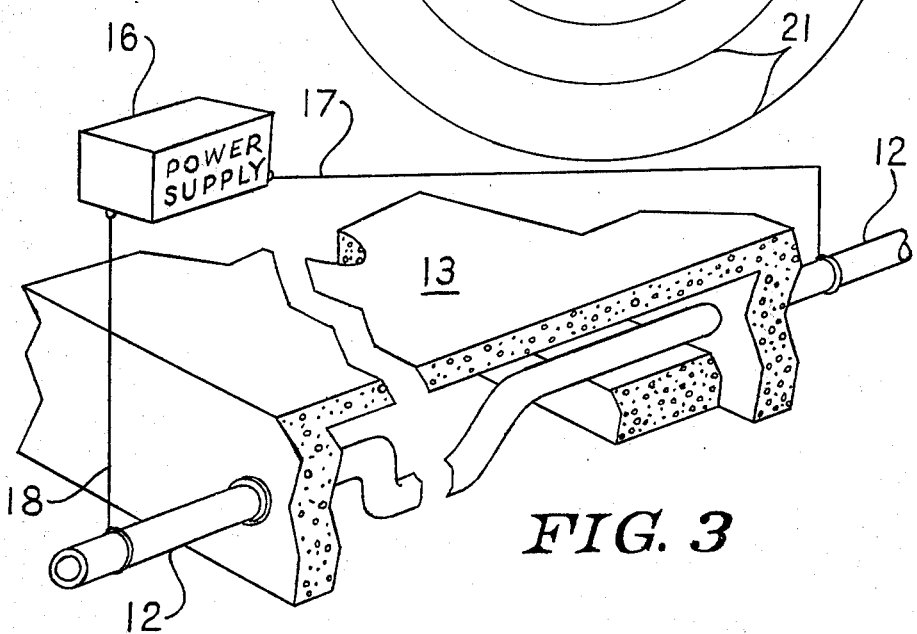
FIG. 3 is a schematic illustration of the manner of employing the overall invention hereof.

The apparatus of the present invention comprises a locator 11 which incorporates a flat directional pickup coil operating an audio or visual indicator through electronic circuitry as described below. The method of the present invention provides for the precise location of a buried electrically conducting element and, in this respect, reference is made to FIGS. 1 and 3 of the drawings. An electrically conducting element, such as a conduit 12, which is disposed beneath an obscuring surface 13, is electrically energized to pass an alternating current therethrough. This electrical energization may be achieved by means of an alternating current power supply 16 having conductors 17 and 18 extending therefrom into electrical connection with the conduit 12 at opposite ends of the length of conduit to be located.

Figure 1:
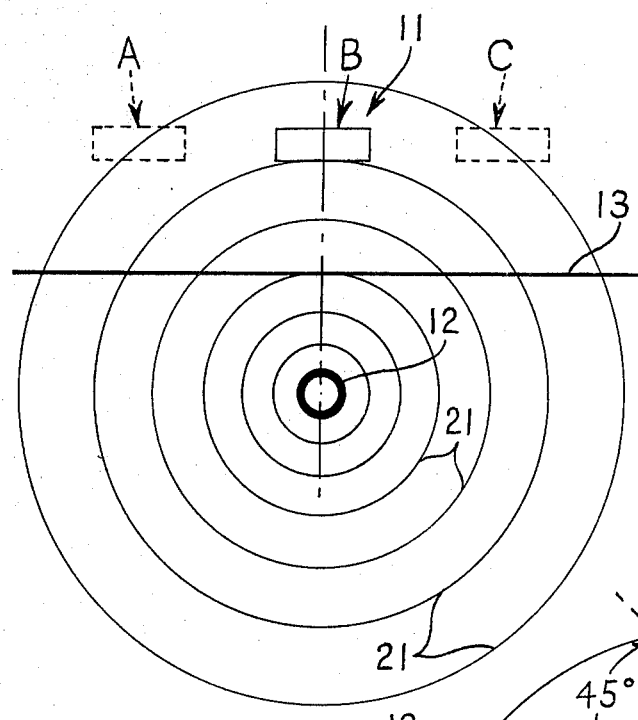
FIG. 1 is a schematic illustration of use of the present invention in the precise location of a buried electrically conducting element.

The passage of alternating current through the element or conduit 12 produces an alternating magnetic field about the conduit with such field having lines of force 21, as indicated in FIG. 1. The magnetic field about the element or conduit 12 encircles same in one direction and then collapses and encircles same in an opposite direction. The method of the present invention comprises the initial disposition of the directional pickup coil carried in the locator 11 parallel to the surface 13 beneath or behind which the conduit 12 is disposed. With the coil initially positioned at position A of FIG. 1, for example, it will be seen that the turns of the coil are cut by a varying magnetic field to thereby induce a signal in the pickup coil. As the pickup coil is moved from position A in FIG. 1 to the right therein, the coil moves into various increasing field strengths so that the signal induced in the coil is increased. This continues until the coil is located at position B of FIG. 1 whereat the directional pickup coil is aligned with the lines of force of the magnetic field about the conduit 12 and in this position no signal is induced in the coil. Coil signals are herein employed to produce an indication of the presence and strength thereof and thus it will be seen that, as the coil is moved from position A to position B, the indicator will show an increasing signal until location B is reached whereat the indicator will show no signal. At position B the coil is aligned with the conduit beneath the surface 13. Thus at this position the location of the conduit is precisely determined by the absence of signals generated in the directional pickup coil of the locator. Movement of the locator further to the right of FIG. 1 will cause misalignment of the directional pickup coil with the lines of force of the magnetic field about the conduit and will thus then again generator or induce signals in the coil which are indicated. It is particularly noted that alignment of the directional pickup coil with lines of force of a magnetic field causes no signal to be generated in the pickup coil. The foregoing procedure may be repeated along the length of the buried conduit or element 12 to precisely trace the path of same beneath the surface 13. It will be appreciated that this operation is quite simply carried out and does provide a very accurate method of locating the conduit at all portions thereof beneath a buried surface. The method of the present invention is also applicable to a determination of the depth of the conduit beneath the surface 13; however, before proceeding with a description of this further portion of the present method, reference is made to the circuitry and structure of the locator of the present invention.

Figure 4:
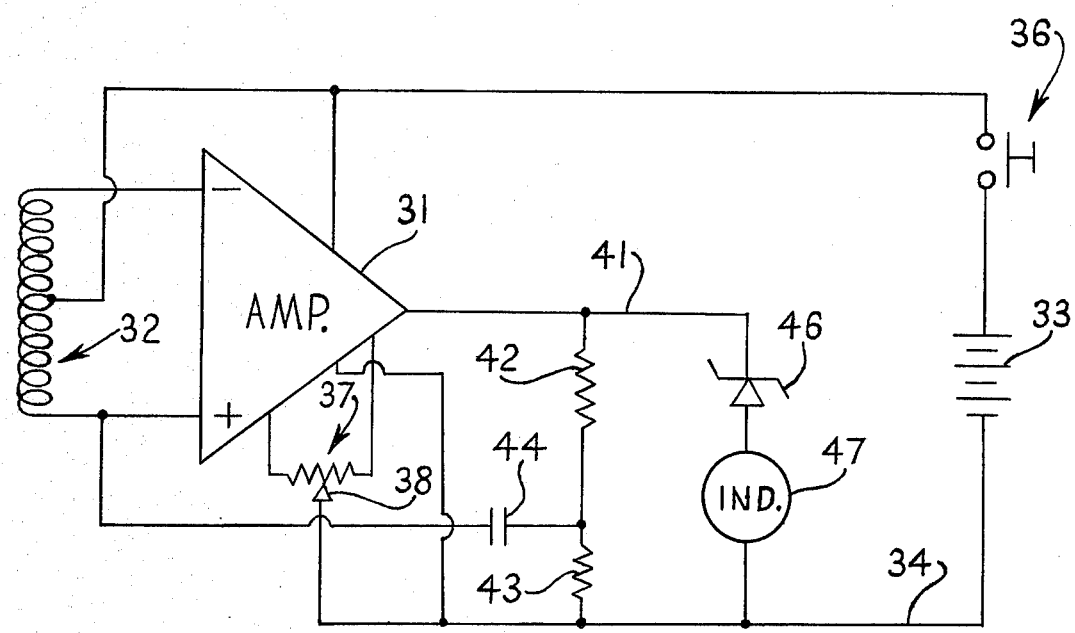
FIG. 4 is a circuit diagram of apparatus of the present invention.

Referring now to FIG. 4, there will be seen to be illustrated an integrated circuit operational amplifier 31 having a directional pickup coil 32 connected across the inputs thereof. A power supply 33 such as a transistor battery has the negative side thereof connected through a conductor 34 to one power supply terminal of the amplifier 31 and has the positive side thereof connected through a switch 36 to the other power supply terminal of the amplifier 31 and also to a center tap of the directional pickup coil 32. An offset voltage potentiometer 37 is connected between offset voltage terminals of the amplifier 31 and has a movable contact 38 thereof connected to the negative battery conductor 34. The amplifier 31 may be a conventional integrated circuit operational amplifier which is provided with offset null terminals across which an external potentiometer is normally connected to adjust the offset voltage thereof. In the present instance this offset voltage is adjusted to cause the amplifier to operate at the verge of breaking into one-shot oscillation. The rate of such oscillation is controlled by the circuit of FIG. 4 by the connection of a feedback circuit across the amplifier. The output terminal of the amplifier 31 has a conductor 41 extending therefrom and this conductor is connected through series resistors 42 and 43 to the negative power supply conductor 34. A capacitor 44 is connected from the juncture of resistors 42 and 43 to the positive signal input terminal of the amplifier 31. By the appropriate choice of values of resistors 42 and 43 and the capacitor 44, a desired rate of oscillation of the amplifier 31 with minimal input from the directional pickup coil 32 may be achieved. The circuit of FIG. 4 further includes a Zener diode 46 connected in series with an indicator 47 between the amplifier output conductor 41 and the negative power supply conductor 34. The diode 46 in series with the indicator 47 biases off the amplifier output dc level to prevent a continuous indication at indicator 47. This indicator 47 may comprise either audio or visual signalling means and in the present example is taken as an audio generator.

The present description of the locator assumes an energization of the wire to be located at a nominal frequency such as 60 cycles; however, a high frequency energization, such as 1,000 cycles per second, will produce a high frequency oscillation output that operates the indicator continuously.

As noted above, the circuit of FIG. 4 is initially adjusted so that a desired minimum signal induced in the coil 32 will produce very low frequency amplifier oscillation so that the indicator 47 produces recurrent "beeps" at a lower repetition rate.

Input signals to the operational amplifier comprise the alternating current signals induced in the coil 32 upon the dc level established by the power supply 33 and, with appropriate setting of the circuit as briefly described above, the audio generator 47 produces beeps at a rate dependent upon the intensity and frequency of the field inducing a voltage in the pickup loop 32.

Referring now back to FIG. 1 and the above-described method of the present invention, it will be appreciated from the circuitry of FIG. 4 that, with the plane of the coil 32 parallel to the surface 13, movement of the coil parallel to the surface 13 moves the coil into an increasing alternating magnetic field so that the pickup loop or coil will have an increasing voltage induced therein. This will then increase the rate of oscillation of the amplifier 31 so that the reptition rate of the beeps or sounds from the audio generator 47 increases. This increase will continue until the coil is located at the position indicated by B of FIG. 1 whereat the coil 32 is parallel to the lines of force 21 about the conduit 21 and consequently does not have any current generated therein inasmuch as the voltage induced in the legs of the coil are equal in amplitude and opposite in phase. This then terminates oscillation of the amplifier 31 so that the sound output of the sound generator 47 suddenly terminates. In this position the pickup coil in the locator 11 is disposed immediately above the buried element or conduit 12. Thus the conduit is readily located as to lateral disposition beneath the surface 13.

Figure 2:
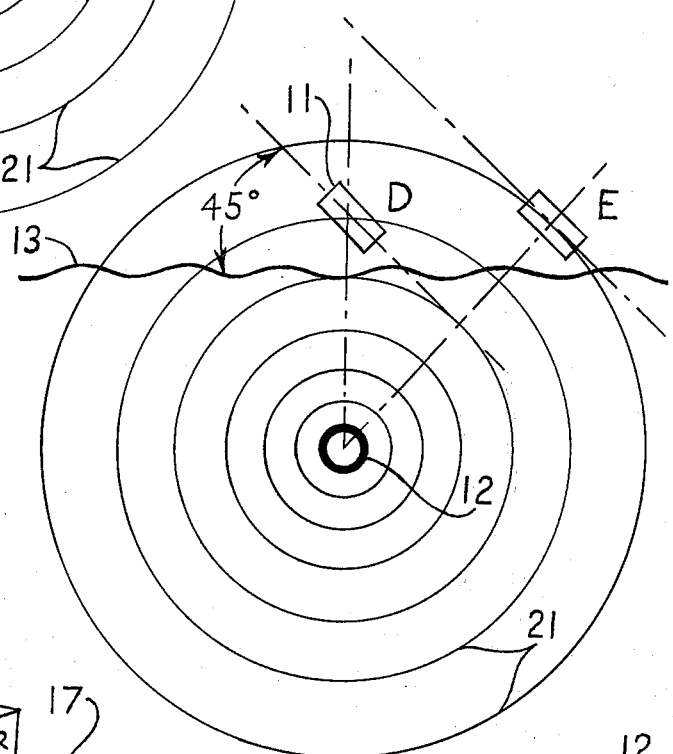
FIG. 2 is a schematic illustration of the steps involved in the method of the present invention in determining the depth of an electrically conducting element below an obscuring surface.

Considering now the method of the present invention for determining the depth of the element or conduit 12 beneath the surface 13, reference is made to FIG. 2. Following location of the conduit 12 and with the locator 11 directly in line with the conduit 12, the indicator is then tilted at an angle of 45° to the surface 13. This places the pickup coil 32 of the locator at a substantial angle to the lines of force of the magnetic field about the conduit and, consequently, generates a rapid rate of audio signals from the locator. The locator is then moved along the surface 13 at the same height and maintaining the locator angle of 45° with respect to the surface. At some point as the locator is moved along the surface, the locator and pickup coil 32 thereof will become parallel to the lines of force 21 of the magnetic field surrounding the conduit 12. In FIG. 2 the initial position of the locator is indicated by the letter D and the terminal position whereat the locator and coil thereof is parallel to the lines of force of the magnetic field by the letter E. The distance that the locator and pickup coil have been moved parallel to the surface 13 is then equal to the depth of the conduit 12 below the original position of the locator coil at D. That the foregoing is true may be determined by triangulation.

Figure 5:
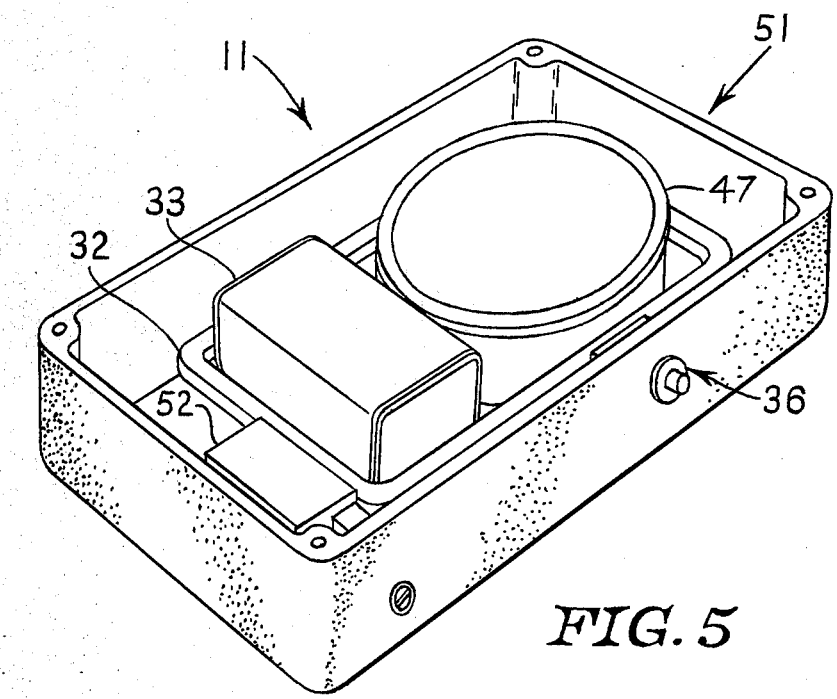
FIG. 5 is a perspective illustration of the locator of the present invention.

The locator 11 of the present invention may be formed as a compact hand-held unit somewhat as illustrated in FIG. 5. A small housing 51 formed of aluminum, for example, is shown to contain an audio indicator or generator 47, battery 33 and circuitry 52, as illustrated in FIG. 4. The directional pickup coil 32 is disposed about the interior of the housing 51 and a switch 36 extends through the housing for actuation by an operator carrying the locator. A cover, not shown, closes the housing 51 and appropriate electrical conductors interconnect the elements within the housing in the manner illustrated in FIG. 4.

It will be seen that the present invention provides a simple hand-held locator which may be readily and reliably employed to precisely determine the location of a buried electrically conducting element. The method of the present invention provides for determining both the lateral disposition of a buried element and for determining the depth of the element. The present invention has a wide variety of applications in addition to those which are immediately apparent, including such uses as detecting leakage currents in wires, the sorting of wires in bundles, indicating circuit overload or charging rate, hot power line identification and many others. Clearly the invention may be employed to detect or identify current carrying lines as well as the location of such lines and thus may be employed in a vehicle to follow a current carrying conductor embedded in a roadway for automatic and semiautomatic steering systems, and the simplicity of the invention commends the invention to widespread application.

The present invention has been described above with respect to a single preferred embodiment thereof; however, it is not intended to limit the invention to precise details of description or illustration as it will be apparent to those skilled in the art that modifications and variations thereof may be made within the true scope of the invention.

What is claimed is:

1. A locator for a buried conductor having alternating current passing there-through, comprising
    a directional pickup coil having a center tap,
    an operational amplifier having negative and positive input terminals connected across said pickup coil, an output terminal, offset voltage terminals and a first and a second amplifier power terminal,
    a power supply having first and second power supply terminals, said first or positive power supply terminal connected to said first amplifier power terminal and to said center tap, said second or negative power supply terminal connected to said second amplifier power terminal,
    a first resistor connected to said output terminal,
    a second resistor connected between said first resistor and said second power supply terminal,
    a capacitor having one side connected to the juncture between said resistors and another side connected to said positive input terminal,
    said resistors and said capacitor comprising a feedback circuit for said amplifier for establishing a one-shot multivibrator amplifier output dependent on coil signal input of said coil created by the alternating current through said conductor, the frequency of said one-shot multi-vibrator amplifier output increasing with closer proximity of said coil to the magnetic field of said conductor,
    an offset voltage potentiometer across said offset voltage terminals and having a movable contact,
    said movable contact connected to said second power supply terminal, movement of said movable contact adjusting the threshold sensitivity of said amplifier,
    an indicator connected to said output terminal and to said second power supply terminal for producing observable indications of the frequency of said one-shot multi-vibrator amplifier outputs, and a casing enclosing all of the foregoing elements except said conductor.

2. A locator according to claim 1 which further comprises a diode connected on one side to said output terminal and on the other side to said indicator for establishing a predetermined voltage level of indicator operation.

* * * * *